M. SANDERFIELD.
DEMOUNTABLE TRACTOR RIM FOR HARD SURFACES.
APPLICATION FILED JULY 16, 1921.
1,426,511.
Patented Aug. 22, 1922.
3 SHEETS—SHEET 1.
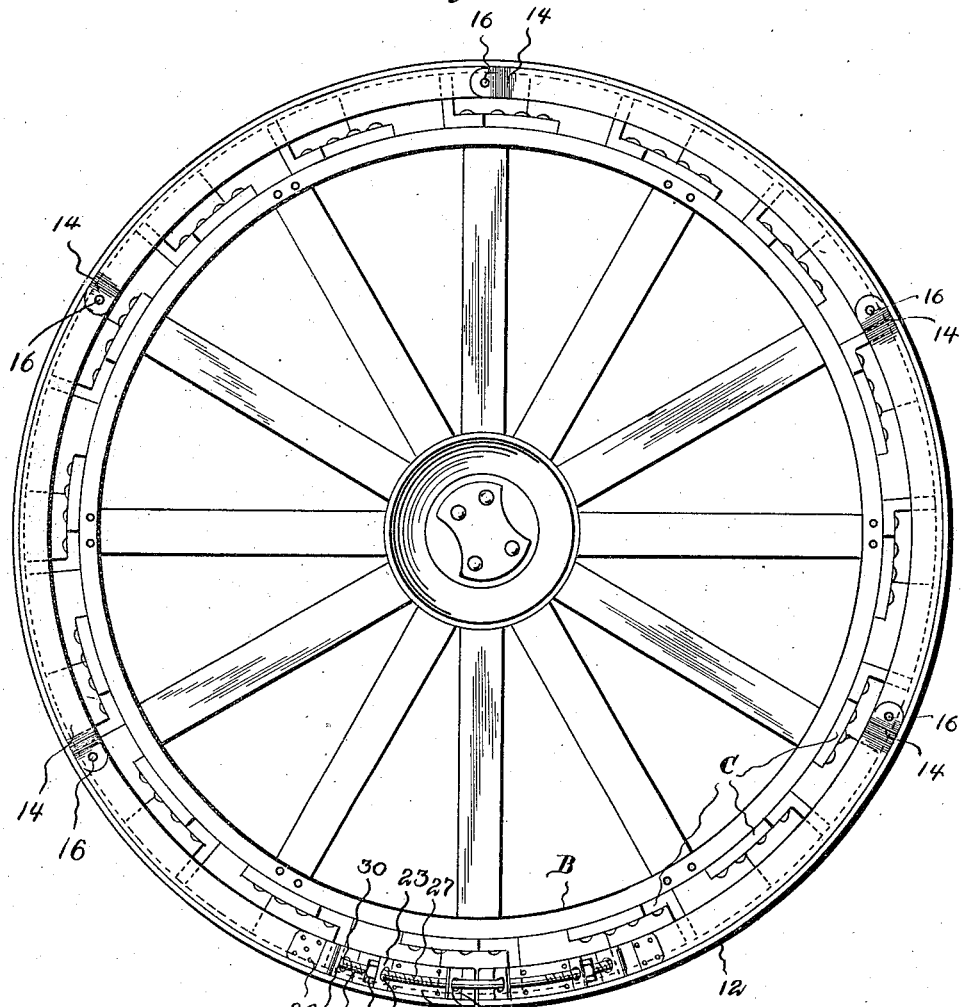
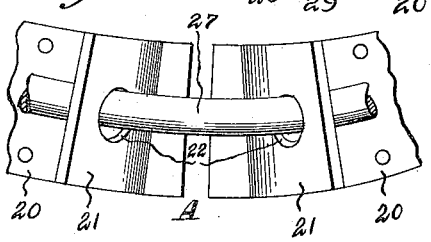
Martin Sanderfield
INVENTOR.
BY
Watson E. Coleman
ATTORNEY.

M. SANDERFIELD.
DEMOUNTABLE TRACTOR RIM FOR HARD SURFACES.
APPLICATION FILED JULY 16, 1921.
1,426,511.
Patented Aug. 22, 1922.
3 SHEETS—SHEET 2.
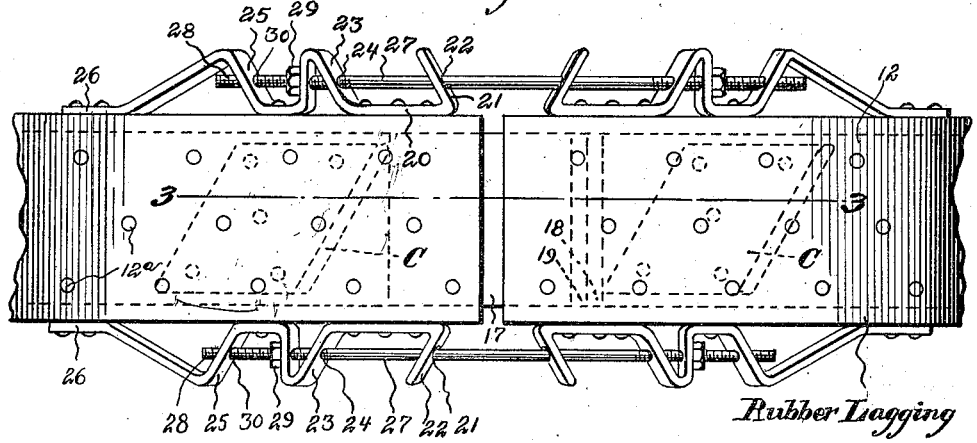
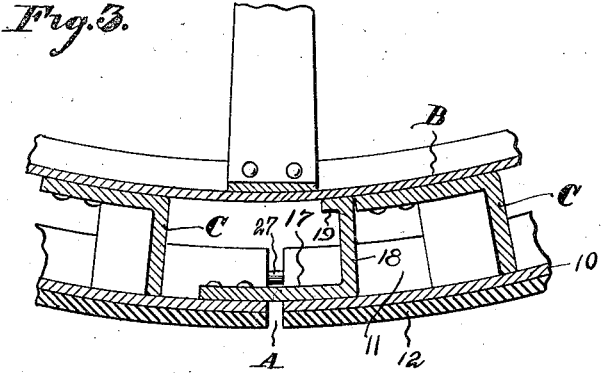
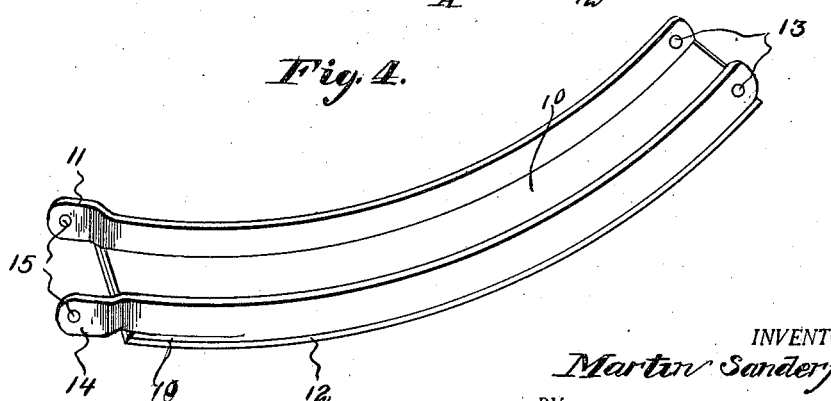
INVENTOR.
Martin Sanderfield
BY
Watson E. Coleman
ATTORNEY.

M. SANDERFIELD.
DEMOUNTABLE TRACTOR RIM FOR HARD SURFACES.
APPLICATION FILED JULY 16, 1921.

1,426,511.

Patented Aug. 22, 1922.

INVENTOR.
Martin Sanderfield
BY
Watson E. Coleman
ATTORNEY.

UNITED STATES PATENT OFFICE.

MARTIN SANDERFIELD, OF ATHENS, ILLINOIS.

DEMOUNTABLE TRACTOR RIM FOR HARD SURFACES.

1,426,511.  Specification of Letters Patent.  Patented Aug. 22, 1922.

Application filed July 16, 1921. Serial No. 485,282.

*To all whom it may concern:*

Be it known that I, MARTIN SANDERFIELD, a citizen of the United States, residing at Athens, in the county of Menard and State of Illinois, have invented certain new and useful Improvements in Demountable Tractor Rims for Hard Surfaces, of which the following is a specification, reference being had to the accompanying drawings.

This invention relates to tractors, and particularly to demountable rims therefor.

The great majority of tractors have their rims provided with lugs, strakes or like devices for securing traction and the front wheels of the tractors are quite usually provided with lugs and often with a single longitudinal flange so that the front wheels may take into the ground and steer the machine properly without side slip. While these lugs, flanges, and like projections are necessary on tractors in order to secure tractive engagement with soft ground, as in plowing, hauling over fields, cultivating, and like work, these lugs or projections are decidedly objectionable if it is desired to move the tractor from place to place over ordinary country roads, either hard or soft, for the reason that if the road is soft the teeth or lugs on the tractor wheels will cut up the road, doing a great deal of damage to it, and even if the ground is hard they will tend to cut up the road and if the road surface is too hard for the lugs to cut it up, then the tractor will be jolted, jarred and shaken to such an extent as to seriously damage the engine and inconvenience the operator of the tractor.

Again, if these tractors are to be exhibited and demonstrated on city streets or on the floors of warehouses, exhibition rooms, etc., they will be liable to injure the streets and injure the floor surfaces over which the tractor is being moved or, as before stated, jar and jolt the engine of the tractor so as to seriously damage it and jar the driver of the tractor.

In consequence of the damage done to roads and streets by tractors having lugs or flanges on the traction wheels, many States and many cities forbid the driving of tractors over their roads or streets.

With these objects in mind, the main object of my invention is to provide a rim adapted to be disposed around a traction wheel and adapted to sheath the lugs or flanges thereof, and provide a relatively smooth periphery for the traction wheel, permitting the traction wheel to travel over roads, either hard or soft, and permitting the tractor to be driven over city streets, hardwood floors, cement floors, etc.

A further object is to provide a device of this character so constructed that a full tractive engagement may be secured between the rim and the road or surface over which it travels.

Still another object is to provide a rim of this character which may be readily applied to the tractor wheel or readily removed therefrom, and specifically to provide a rim which may be laid upon the ground and then the tractor wheel driven thereon and then the rim closed around the tractor wheel and readily engaged therewith.

Another object is to provide an improved means for connecting the two ends of the rim and for forcing the demountable rim in close contact with the lugs on the tractor wheel.

And another object is to provide means for bracing the rim at the junction between the ends thereof.

Other objects will appear in the course of the following description.

My invention is illustrated in the accompanying drawings, wherein:—

Figure 1 is an elevation of a tractor wheel with my improved demountable rim applied thereto;

Figure 2 is a fragmentary face view of the rim looking at the joint thereof;

Figure 3 is a fragmentary longitudinal sectional view along the line 3—3 of Figure 2;

Figure 4 is a perspective view of one of the rim sections;

Figure 7 is an enlarged perspective view of the rim at the joint showing the manner in which the bolt 27 engages the perforations 22 to draw the rim into place;

Figure 5:
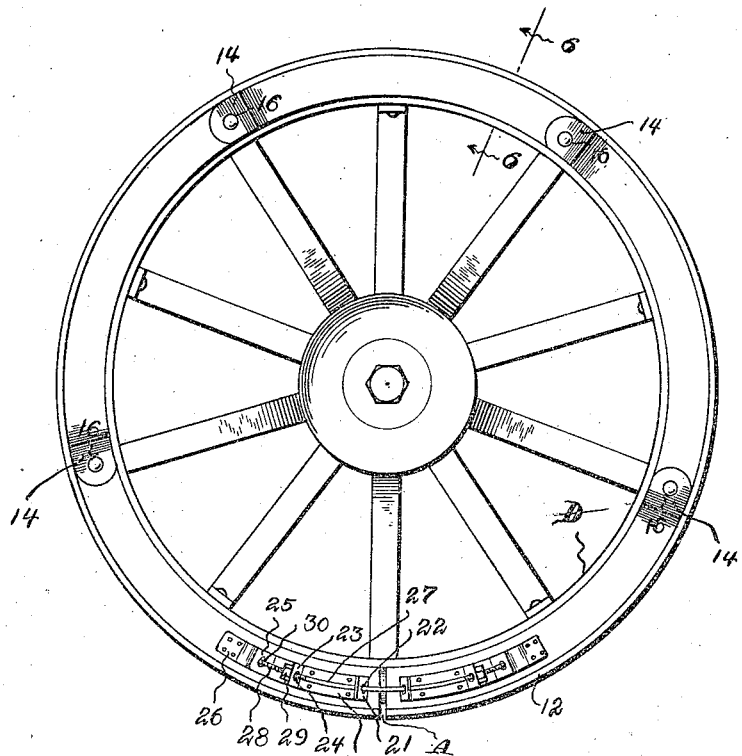
Figure 5 is a view of the front wheel of a tractor having my improved rim applied thereto.
Figure 6:
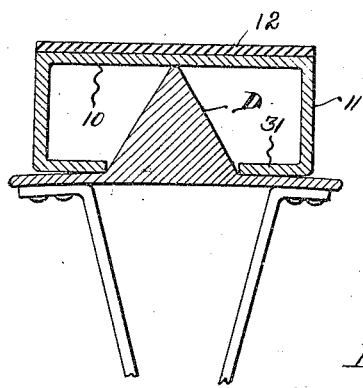
Figure 6 is a section on the line 6—6 of Figure 5.

In the accompanying drawings, I have illustrated the principle of my construction as applied to a rim for the front wheels of the tractor and a rim for the rear wheels of the tractor. The principle of the two devices is the same, though they vary in details in order to suit them for their different purposes.

I will first describe the rim which is applied to the rear wheels of the tractor. This demountable rim is formed of a plurality of sections, there being as many sections as may be desired, as for instance six sections to a wheel, each of these sections being constructed as in Figure 4, each section consisting of a transversely extending web 10 having two side walls 11, these side walls extending approximately at right angles to the web 10. To the bottom of this web 10 is riveted by rivets 12ª a lagging of rubber or other suitable material, designated 12. This lagging might be made of rubber, leather, or any other suitable material which will give a tractive surface. The side walls 11 at one end terminate at the end of the bottom 10 of this shoe or rim and are provided with the openings 13. The side walls 11 at the other end of this section, however, extend beyond the tread or bottom portion, as at 14, and are provided with the openings 15. These sections are connected by rivets 16 extending through the tongues 14 or projecting portions of the side walls and through the perforations 13, thus pivoting the sections to each other. It will be noticed that the projecting tongues 14 are slightly greater in width than the width of the side walls 11.

At the joint A between the ends of the sections, the web 10 has riveted to it the brace plate 17 which is relatively long and at its extremity extends inward at a right angle, as at 18, the marginal end of this angular extremity 18 being in turn angularly bent backward, as at 19. Thus it will be seen that this plate 17 extends over the joint A when the rim is placed around the wheel.

For the purpose of holding the rim in position upon a wheel and yet permitting the rim to be readily removed therefrom, I provide the side walls 11 with the fastening means illustrated in Figure 2. Each side wall at the meeting end of the rim has riveted to it a plate 20, that end of the plate adjacent the joint A being bent outward and rearward, as at 21, and having an elongated perforation 22. Rearward of this flange 21 the plate is bent outward and then inward to form an approximately V-shaped flange 23 which is also perforated, as at 24, and rearward of this flange the plate is outwardly bent, as at 25, at right angles to the body of the plate, then inclined inward and rearward toward the side wall 11, and then extended along parallel to the side wall and riveted, as at 26. Passing through the aperture 22 and through the apertures 24 on each side of the wall at the joint thereof is a longitudinally curved bolt 27 smaller than the apertures 22 and slightly smaller than the apertures 24. This bolt is screw-threaded at its extremities, as at 28, and carried upon the screw-threaded extremities are the nuts 29 which are adapted to bear against one face of each approximately V-shaped flange 23. The extremities of the bolts pass through apertures 30 formed in the flange or wall 15.

It will be obvious now that when the nuts 29 are turned up or home, that strain will be placed upon the V-shaped flanges 23 and the two ends of the demountable rim will be drawn toward each other, clamping the rim tightly upon the tractor wheel, the lugs or flanges of the tractor wheel resting against the web 10 of the rim and supporting the same. The flange 19 of the brace plates 17 also rests against the rim of the tractor wheel and the plate 17 rests against the inner face of the web 10 so that the joint A is securely braced against strain or against any inward movement. By reason of the fact that the apertures 22 are elongated inward toward the hub of the wheel, it will be obvious that the turning home of the nuts 29 tends to straighten the bolt 27 (see Figure 7) so that the bolt contacts with the upper walls of the perforations 22 and not only clamps the demountable rim tightly around the wheel, but forces the web of the rim inward against the lugs.

I have illustrated a tractor wheel having a rim B provided with transversely extending, right angular lugs C, but obviously this is merely to show a type of tractor wheel and obviously my device can be used on other forms of tractor wheel than that shown. I have heretofore described the device as being applicable to the rear wheels of tractors, but with modifications it is equally applicable to the front wheels of tractors. One of these wheels D is illustrated in Figure 5, and it will be seen that that the rim of this wheel is provided with the medially disposed, outwardly projecting, V-shaped flange $d$. The rim which is applied to this type of wheel is precisely the same as that applied to the rear wheel, save for the fact that the lateral wall 11 of the web 10 are inwardly flanged, as at 31, so as to fit against the rim of the tractor and accommodate the medial flange $d$ which holds the rim in place and from lateral movement. Otherwise than this, this demountable rim is constructed precisely the same as the rim heretofore described, is formed in pivoted sections, and the rim is held upon the wheel by the longitudinal bolts 27 in the same manner as before described.

The brace 18 is to be omitted, or if provided is cleft or formed in two parts to accommodate the medial flange $d$. In the use of this demountable rim, when it is desired to apply the rims, they are unbolted and are laid upon the ground and the tractor run upon these rims. Then the rims are brought up around the tractor wheels and fastened by the two bolts 27 on each side of each rim, and then the nuts 29 are tightened up, thus tightening the rims upon the wheel. The side flanges 11 extend up on each side of the lugs C of the traction wheel and prevent any lateral movement of the demountable rim.

It will be seen that this rim may be readily applied to the traction wheels or readily removed therefrom and that it is light and easily handled and easily carried, and that by its use the farmer can readily transform his tractor so that it may be used on hard ground, over hard roads or soft roads, city streets, or even over hardwood floors, the rubber lagging securing sufficient tractive surface for the tractor wheel without, however, in any way marring or injuring the hard surfaces over which the tractor operates. Furthermore, this lagging being smooth upon its outer face prevents any jolts or jars being given to the tractor which would damage the machinery thereof or inconvenience the driver.

It is to be particularly noted that this device will save considerable time to farmers and others owning tractors who desire to drive the tractor over hard, dry, dirt roads or over hard surface roads, as it is a matter of but a few minutes to put the rims in place or to remove them, whereas with the ordinary form of tractor it is a matter of hours to remove and replace the lugs, and furthermore the lugs on the wheels of some tractors are not removable so that the owner would be at a disadvantage unless he had some sort of rim to extend over the lugs. A further matter to be noted is that it is not necessary to have lagging on the exterior surface of my demountable rim where the owner merely desires to use the demountable rim for transporting his tractor from one locality to another. Therefore, I do not wish to be limited to the use of lagging.

I claim:—

1. A demountable rim for traction wheels of the character described comprising a rim having side flanges, the rim being formed in sections pivoted to each other and adapted to be disposed around the rim of a tractor wheel over the lugs thereof, a plurality of flanges projecting from the side flanges of the rim on each side of the joint in the rim and having a series of openings disposed in a line concentric to the axis of the traction wheel, and longitudinally curved bolts passing through the openings in the flanges whereby said demountable rim may be contracted into engagement with the tractor wheel.

2. A demountable rim for traction wheels formed of a plurality of transverse U-shaped sections, the sections having pivotal engagement with each other and each section having a smooth tractive tread surface, the sections on each side of the joint of said rim and on each side wall thereof having attached thereto longitudinally extending plates, each plate at its end adjacent the joint being outwardly and rearwardly bent and formed with an elongated aperture, each plate rearward of this flange being formed with an apertured V-shaped flange and rearward of this flange being outwardly bent and then inclined inward toward the side wall of the section and then attached thereto, the outwardly bent portion being perforated, a curved bolt on each side of the rim passing through the perforations of all of said flanges, and nuts on said bolt engaging the V-shaped flanges.

3. A demountable rim for tractors formed of a plurality of sections, each of said sections being U-shaped in cross section and the sections being pivoted to each other, one end section of the demountable rim having attached to its free extremity on its inside face a longitudinally extending brace plate adapted to extend over the joint between the two ends of the demountable rim and rest upon the inside face of the adjacent section, said brace plate at its extremity being inwardly bent at right angles to the brace plate and flanged to rest against the traction wheel, the side walls of the sections adjacent the joint being formed with outwardly projecting flanges, and bolts on each side of the confronting sections extending through said flanges and having nuts thereon whereby the sections may be tightened upon the wheel.

In testimony whereof I hereunto affix my signature.

MARTIN SANDERFIELD.